(12) United States Patent
Tanaka (10) Patent No.: US 10,818,928 B2
(45) Date of Patent: Oct. 27, 2020

(54) ELECTRODE FOR RECHARGEABLE LITHIUM BATTERY, RECHARGEABLE LITHIUM BATTERY, AND METHOD OF FABRICATING ELECTRODE FOR RECHARGEABLE LITHIUM BATTERY

(71) Applicant: SAMSUNG SDI CO., LTD., Yongin-si, Gyeonggi-do (KR)

(72) Inventor: Tadayoshi Tanaka, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 920 days.

(21) Appl. No.: 14/970,321

(22) Filed: Dec. 15, 2015

(65) Prior Publication Data

US 2016/0172680 A1 Jun. 16, 2016

(30) Foreign Application Priority Data

Dec. 15, 2014 (JP) ................................ 2014-253111
Oct. 16, 2015 (KR) ......................... 10-2015-0144683

(51) Int. Cl.
*H01M 4/62* (2006.01)
*H01M 10/0525* (2010.01)
(Continued)

(52) U.S. Cl.
CPC ........... *H01M 4/625* (2013.01); *H01M 4/043* (2013.01); *H01M 4/0404* (2013.01);
(Continued)

(58) Field of Classification Search
CPC .... H01M 4/625; H01M 4/0404; H01M 4/043; H01M 4/139; H01M 10/0525;
(Continued)

(56) References Cited

U.S. PATENT DOCUMENTS

2011/0183206 A1* 7/2011 Davis .................... B82Y 30/00
429/218.1
2012/0107658 A1 5/2012 Kwon et al.
(Continued)

FOREIGN PATENT DOCUMENTS

JP 8-287954 A 11/1996
JP 2007-250510 A 9/2007
(Continued)

OTHER PUBLICATIONS

Abstract and English Machine Translation of Japanese Patent Publication No. JP 8-287954 A, Nov. 1, 1996, 6 Pages.
(Continued)

*Primary Examiner* — Milton I Cano
*Assistant Examiner* — Philip A. Stuckey
(74) *Attorney, Agent, or Firm* — Lewis Roca Rothgerber Christie LLP (57) ABSTRACT

There is provided an electrode for a rechargeable lithium battery including a current collector, and an active material layer on the current collector, the active material layer including a plurality of active material patterns having a band shape and a plurality of carbon layers between the neighboring active material patterns, wherein neighboring ones of the carbon layers have a gap of greater than about 1 mm and less than about 10 mm.

4 Claims, 4 Drawing Sheets

(51) Int. Cl.
    *H01M 4/04* (2006.01)
    *H01M 4/139* (2010.01)

(52) U.S. Cl.
    CPC ....... *H01M 4/139* (2013.01); *H01M 10/0525* (2013.01); *H01M 2220/20* (2013.01); *H01M 2220/30* (2013.01); *Y02E 60/122* (2013.01); *Y02T 10/7011* (2013.01)

(58) Field of Classification Search
    CPC .......... H01M 2220/20; H01M 2220/30; Y02T 10/7011; Y02E 60/122
    USPC .......................................................... 429/232
    See application file for complete search history.

(56) References Cited

U.S. PATENT DOCUMENTS

| | | |
|---|---|---|
| 2012/0321945 A1 | 12/2012 | Park |
| 2013/0212879 A1* | 8/2013 | Ogino ................... H01R 43/16 29/885 |
| 2014/0050977 A1 | 2/2014 | Sanada et al. |
| 2015/0010788 A1* | 1/2015 | Aria ....................... H01M 4/13 429/50 |
| 2015/0044560 A1* | 2/2015 | Ogino ................... H01M 4/134 429/217 |
| 2016/0164079 A1 | 6/2016 | Bae et al. |
| 2016/0226064 A1 | 8/2016 | Kitayoshi |

FOREIGN PATENT DOCUMENTS

| | | |
|---|---|---|
| JP | 2013-251147 A | 12/2013 |
| JP | 2014-022220 A | 2/2014 |
| JP | 2014-38795 A | 2/2014 |
| JP | 2014-229479 A | 12/2014 |
| JP | 2015-72753 A | 4/2015 |
| JP | 2016-66426 A | 4/2016 |
| KR | 10-2012-0019977 A | 3/2012 |

OTHER PUBLICATIONS

Abstract and English Machine Translation of Japanese Patent Publication No. JP 2007-250510 A, Sep. 27, 2007, 11 Pages.
Abstract and English Machine Translation of Japanese Patent Publication No. JP 2013-251147 A, Dec. 12, 2013, 18 Pages.
Abstract and English Machine Translation of Japanese Patent Publication No. JP 2014-022220 A, Feb. 3, 2014, 15 Pages.
Japanese Office Action dated Oct. 16, 2018, for corresponding Japanese Patent Application No. 2014-253111 (2 pages).

\* cited by examiner

ELECTRODE FOR RECHARGEABLE LITHIUM BATTERY, RECHARGEABLE LITHIUM BATTERY, AND METHOD OF FABRICATING ELECTRODE FOR RECHARGEABLE LITHIUM BATTERY

CROSS-REFERENCE TO RELATED APPLICATIONS

This application claims priority to, and the benefit of, Japanese Patent Application No. 2014-253111 filed in the Japan Patent Office on Dec. 15, 2014, and Korean Patent Application No. 10-2015-0144683 filed in the Korean Intellectual Property Office on Oct. 16, 2015, the entire contents of both applications are incorporated herein by reference.

BACKGROUND

1. Field

Aspects of the present invention relate to an electrode for a rechargeable lithium battery, a rechargeable lithium battery, and a method of fabricating the electrode for a rechargeable lithium battery.

2. Description of the Related Art

Recently, rechargeable lithium ion batteries having high energy density and high capacity have been widely used as power sources for portable electronic devices, electric vehicles, and/or power storages.

In particular, a rechargeable lithium ion battery should have a high capacity, as electronic devices and the like consume increasing amounts of power due to down-sizing and multi-functionalization. Accordingly, the rechargeable lithium ion battery includes an active material in a relatively high ratio in order to obtain a high-capacity of the rechargeable lithium ion battery (lithium ion secondary battery). For example, the active material may be included in a relatively high ratio in the battery by coating the active material on a current collector to be relatively thick and highly densified to produce a thick and dense active material layer.

However, when the active material is coated to be thick on the current collector, a problem emerges as follows.

The active material experiences a volume change during charge and discharge cycles, which stresses the active material causing it to easily delaminate from the current collector.

Accordingly, a method of preventing the delamination of the active material from the current collector by coating the active material as a stripe pattern on the current collector and alleviating the stress due to a gap among the striped active material has been disclosed.

In addition, when the active material is coated to be thick on the current collector and dried to fabricate an electrode, the active material is contracted during drying and curing and thus easily cracked.

Accordingly, a method of suppressing the crack by separately twice coating active materials having different viscosity on the current collector and drying them has been disclosed.

In addition, when the active material layer is formed to be thick and have high density, there may be a problem of deteriorating lithium ion conductivity of the active material layer. When the lithium ion conductivity is deteriorated, an intercalation and deintercalation of lithium ion is rate-determined particularly at the side of the active material layer contacting the current collector, a charge and discharge reaction is not progressed, and, thus, capacity is deteriorated. In addition, because the charge and discharge reaction becomes more non-uniform in the depth direction of the active material layer, and particularly, because an irreversible reaction, such as lithium precipitation on the surface of a negative electrode and the like, occurs in a negative electrode during the charge, capacity deteriorates.

In order to solve this problem, research is conducted on improving ion conductivity of the active material layer in the electrode.

For example, a method of improving ion conductivity in the active material layer by forming a pore in the active material layer to smoothly transfer lithium ions through the pore has been disclosed.

In addition, a method of improving ion conductivity in the active material layer by making an oblique cutout on the active material layer to increase the amount of an electrolyte solution capable of being absorbed in the active material layer has been disclosed.

However, a satisfactory cycle-life may not be obtained from the lithium ion secondary batteries discussed above.

For example, when the pores are formed in the active material layer, the charge and discharge reaction uniformly does not occur in the electrode facing (opposing) the active material layer having the pore, and thus the electrode may be locally deteriorated, thereby failing to obtain a satisfactory cycle-life.

In addition, when the active material layer has the oblique cutout as mentioned, the charge and discharge reaction uniformly does not occur due to deterioration of ion conductivity in the cutout.

Accordingly, an electrode may be locally degraded during the charge and discharge cycles, thus failing in obtaining a satisfactory cycle-life.

SUMMARY

Aspects of embodiments of the present invention are directed toward an electrode for a rechargeable lithium battery being capable of improving cycle-life characteristics, and a rechargeable lithium battery including the same.

Aspects of embodiments of the present invention are directed toward a method of fabricating the electrode for a rechargeable lithium battery.

According to embodiments of the present invention, there is provided an electrode for a rechargeable lithium battery including: a current collector; and an active material layer on the current collector, the active material layer including a plurality of active material patterns having a band shape and a plurality of carbon layers between the neighboring active material patterns, wherein neighboring ones of the carbon layers have a gap of greater than about 1 mm and less than about 10 mm.

In an embodiment, the carbon layers are arranged throughout the active material layer in a film thickness direction.

In an embodiment, each of the carbon layers includes acetylene black, ketjen black, and/or carbon black.

In an embodiment, a rechargeable lithium battery includes: a positive electrode and a negative electrode, wherein at least one of the positive and the negative electrodes is the electrode according to claim 1.

In an embodiment, a rechargeable lithium battery includes: a positive electrode and a negative electrode, wherein the negative electrode is the electrode according to claim 1.

In an embodiment, a rechargeable lithium battery includes: a positive electrode and a negative electrode, wherein the positive electrode is the electrode according to claim 1.

According to embodiments of the present invention, there is provided a method of fabricating an electrode for a rechargeable lithium battery including: providing a plurality of first active material patterns having band shapes by coating slurry including an active material on a current collector, neighboring ones of the first active material patterns having a gap therebetween; providing a carbon layer on sides of each of the first active material patterns by coating a carbon dispersion layer to cover at least the sides of the first active material patterns; and providing a plurality of second active material patterns by coating slurry including an active material on the current collector between the first active material patterns.

In an embodiment, the gap is greater than about 1 mm and less than about 10 mm.

In an embodiment, the carbon layer includes acetylene black, ketjen black, and/or carbon black.

In an embodiment, the method of fabricating the electrode further includes pressing and drying the plurality of first and second active material patterns.

Accordingly, cycle-life characteristics of a rechargeable lithium battery according to embodiments of the present invention may be improved.

Other embodiments are included in the following detailed description.

DETAILED DESCRIPTION

Exemplary embodiments of the present disclosure will hereinafter be described in further detail. However, these embodiments are only exemplary, and this disclosure is not limited thereto.

Hereinafter, a rechargeable lithium battery according to one embodiment is described referring to FIG. 1.

Figure 1:
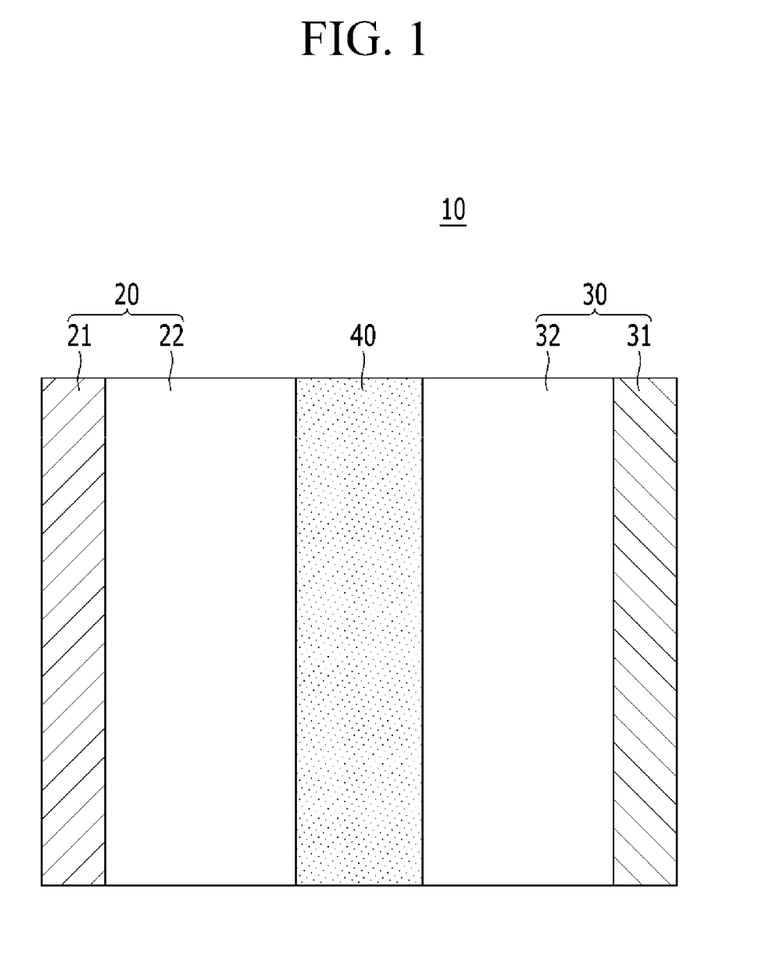
FIG. 1 is a cross-sectional view showing a schematic structure of a rechargeable lithium battery according to one embodiment of the present invention.

FIG. 1 is a cross-sectional view showing the schematic structure of a rechargeable lithium battery according to one embodiment of the present invention. Specifically, FIG. 1 is a schematic view showing the cross section of a rechargeable lithium battery 10 according to one embodiment when cut along a thickness direction.

Referring to FIG. 1, the rechargeable lithium battery 10 includes a positive electrode 20, a negative electrode 30, and a separator layer 40. The rechargeable lithium battery 10 has a charge-reaching voltage (an oxidation reduction potential) of, for example, greater than or equal to about 4.3 V (vs. Li/Li$^+$) and less than or equal to about 5.0 V.

The rechargeable lithium ion battery 10 is not limited to a particular shape, and may have any suitable shape, such as a cylinder shape, a prism laminate-shape, a button shape, and/or the like.

Hereinafter, the negative electrode 30 is further described referring to FIG. 2.

Figure 2:
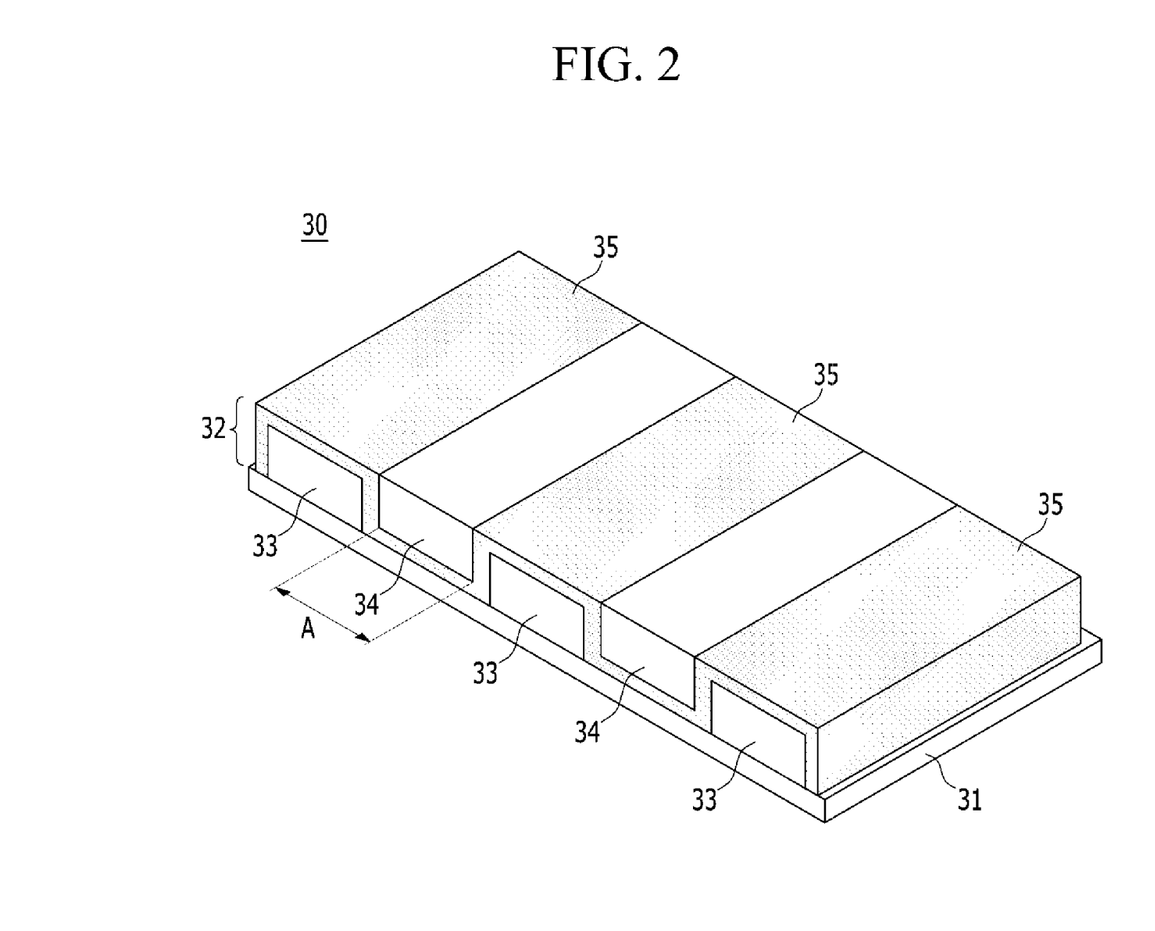
FIG. 2 is a schematic perspective view showing an electrode for a rechargeable lithium battery according to one embodiment of the present invention.

FIG. 2 is a schematic perspective view showing an electrode for a rechargeable lithium battery according to one embodiment of the present invention. Specifically, FIG. 2 is a schematic perspective view showing the negative electrode 30 according to one embodiment when cut along a thickness direction.

The negative electrode 30 includes a current collector 31 and a negative active material layer 32 disposed on the current collector 31.

The current collector 31 may be any conductor and include (e.g. consist of), for example, copper (Cu), stainless steel, nickel plated steel, and/or the like.

The negative active material layer 32 may include a plurality of negative active material patterns 33 and 34 extended as a band shape in the surface direction of the current collector 31 (e.g., extending along a direction substantially orthogonal to the thickness direction). For example, the negative active material patterns 33 and 34 may be alternatively disposed in parallel on the current collector 31.

In addition, carbon layers 35 may be disposed between the negative active material patterns 33 and 34. Furthermore, the carbon layers 35 may also be disposed on the top of the negative active material pattern 33 and at the bottom of the negative active material pattern 34. According to one embodiment, the carbon layers 35 may be disposed at least between the negative active material patterns 33 and 34.

In addition, the carbon layers 35 disposed between the negative active material patterns 33 and 34 may be disposed to penetrate a negative active material layer 32 in a film thickness direction.

The carbon layers 35 between the negative active material patterns 33 and 34 may have a gap A ranging from greater than about 1 mm to about 10 mm.

The negative active material patterns 33 and 34 may be assemblies obtained by laminating a particulate-type (particulate-kind) of negative active material and a suitable binder.

The negative active material may include a carbon-based material. The carbon-based material includes a carbon atom and is also a material that electrochemically intercalates and deintercalates lithium ions.

The carbon-based material may be, for example, graphite such as artificial graphite, natural graphite, a mixture of artificial graphite and natural graphite, natural graphite coated with artificial graphite, and/or the like.

The binder binds negative active material particles with each other, and the negative active materials on a current collector. Examples of the binder include polyvinyl alcohol, carboxylmethyl cellulose (CMC), hydroxypropyl cellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride (PVdF), polyethylene, polypropylene, a styrene-butadiene rubber (SBR), an acrylated styrene-butadiene rubber, an epoxy resin, nylon, and/or the like, but are not limited thereto.

The negative active material patterns 33 and 34 may further include a conductive auxiliary agent. The conductive auxiliary agent may include at least one of acetylene black, ketjen black, and carbon nanotube.

The carbon layer 35 may include at least one of acetylene black, ketjen black, and carbon black having electrical conductivity.

Hereinafter, a negative active material layer 32 is further described referring to FIG. 3.

Figure 3:
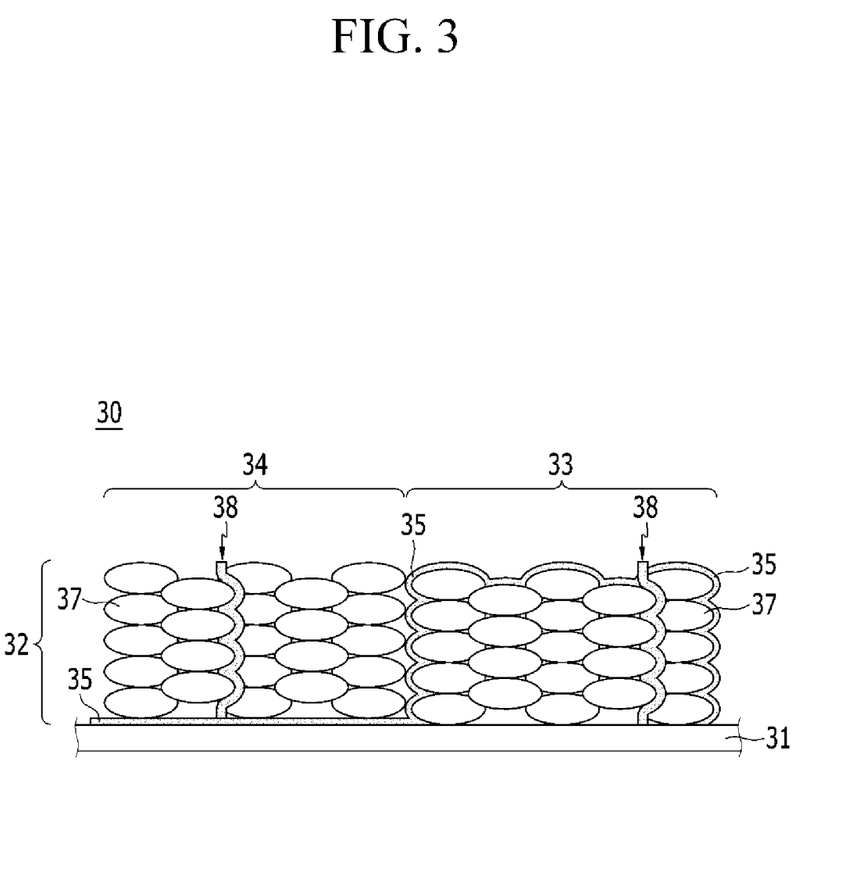
FIG. 3 is a schematic cross-sectional view showing an electrode for a rechargeable lithium battery according to one embodiment of the present invention.

FIG. 3 is a schematic cross-sectional view enlarging an electrode for a rechargeable lithium battery according to one embodiment of the present invention. Specifically, FIG. 3 is an illustration showing an enlarged view of a part of the cross-section of the negative electrode 30, according to one embodiment, when cut along a thickness direction.

Referring to FIG. 3, the negative active material patterns 33 and 34 disposed on the negative active material layer 32 are respectively formed by overlapping and compressing the particulate-type of negative active material 37. In addition, as shown in FIG. 3, the negative active material 37 is less overlapped between the negative active material patterns 33 and 34 than inside the negative active material patterns 33 and 34. Accordingly, ions may pass the carbon layer 35 between the negative active material patterns 33 and 34 and linearly transfer smoothly along the film thickness direction of the negative active material layer 32 without hindrance of the negative active material 37. Accordingly, the smoothly-moving ions increase ion conductivity inside the negative active material layer 32 and promote a charge and discharge reaction thereinside. As a result, because the charge and discharge reaction is more uniformly performed in the negative electrode 30, the rechargeable lithium battery 10 may be prevented or substantially prevented from capacity deterioration due to an irreversible reaction, such as a lithium precipitation, in the negative electrode 30 and may have improved cycle-life characteristics.

In addition, the carbon layer 35 may be disposed between the negative active material patterns 33 and 34. Because the negative active material 37 is less overlapped between the negative active material patterns 33 and 34, electron conductivity inside the negative active material layer 32 may be deteriorated. However, according to one embodiment, the electron conductivity of the negative active material layer 32 may be prevented or substantially prevented from deterioration due to the less overlapped negative active material 37 by disposing the carbon layer 35 including acetylene black having conductivity and the like between the negative active material patterns 33 and 34.

In addition, the carbon layer 35 includes acetylene black having a large specific surface area and may easily soak in an electrolyte. Accordingly, the electrolyte may be induced toward the carbon layer 35 and smoothly permeated between the negative active material patterns 33 and 34. As a result, ions included in the electrolyte may smoothly transfer between the negative active material patterns 33 and 34, and thus, ion conductivity may be further increased inside negative active material layer 32.

Because very small gaps are scattered among the particulate-type of negative active material 37 inside the negative active material patterns 33 and 34, these fine gaps are connected and form a transfer path 38 for ions inside the negative active material layer 32.

Because the ion transfer path 38 inside the negative active material patterns 33 and 34 has a winding and crooked shape along the outline of the particulate-type of negative active material 37, the ions may avoid the negative active material 37 and windingly transfer through the ion transfer path 38 inside the negative active material patterns 33 and 34 in the film thickness direction of the negative active material layer 32. Accordingly, the ions passing via the ion transfer path 38 may not smoothly transfer compared with the ions passing via the carbon layer 35 between the negative active material patterns 33 and 34. Accordingly, the carbon layer 35 is disposed as an ion diffusion path and an electron transfer path inside the negative active material layer 32 according to one embodiment, and the negative active material 37 is less overlapped in the carbon layer 35, thus, ions may smoothly transfer without being hindered by the negative active material 37.

A thickness of the active material layer is not particularly limited, and may be selected appropriately.

Hereinafter, a method of fabricating the negative electrode 30 is further described referring to FIGS. 4A to 4C.

Figure 4A:
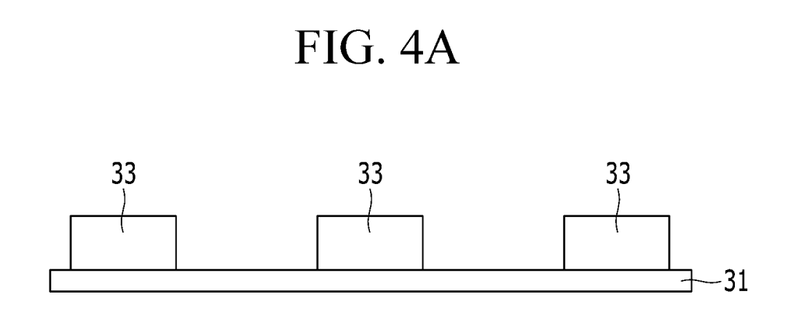
FIGS. 4A-4C are illustrations sequentially showing a process of fabricating the electrode for a rechargeable lithium battery according to one embodiment of the present invention.
Figure 4B:
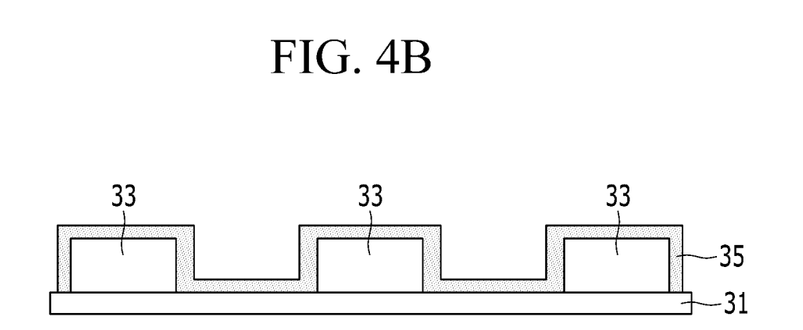
Figure 4C:
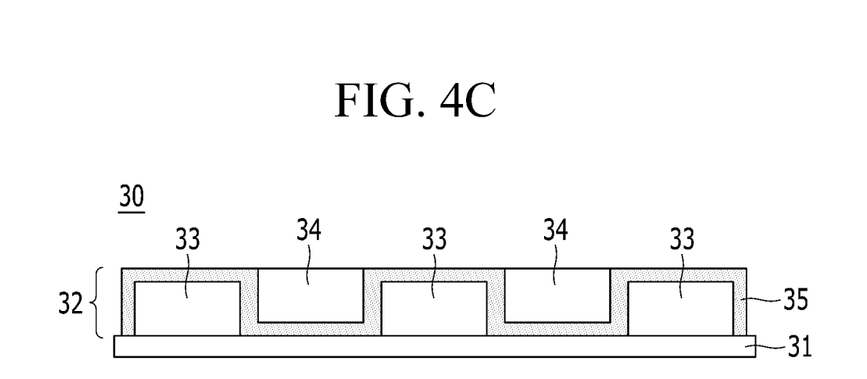

FIGS. 4A, 4B, and 4C are illustrations sequentially showing a process of fabricating an electrode for a rechargeable lithium battery according to one embodiment of the present invention. Specifically, FIGS. 4A to 4C are schematic views showing the cross-section of the negative electrode 30 when cut along a thickness direction in each process of fabricating the negative electrode 30 according to one embodiment.

First, the negative active material 37, a binder, and the like are dry-mixed to prepare a negative active material active mass, and the negative active material active mass is dispersed in an appropriate solvent to adjust viscosity, thus preparing the negative active material active mass slurry.

In addition, a carbon dispersion may be prepared to form the carbon layer 35. For example, the carbon dispersion may be prepared by dispersing a carbon material, such as acetylene black and/or the like, in an appropriate solvent.

Subsequently, as shown in FIG. 4A, the negative active material active mass slurry may be coated as a stripe pattern having a predetermined (preset) gap on a current collector 31. Herein, the coating may be performed by using a nozzle and/or a brush on the current collector 31. Herein, the stripe pattern may have a gap of greater than about 1 mm to less than about 10 mm.

The coated negative active material active mass slurry may be dried with a blow-drier and the like, forming the negative active material pattern 33.

Subsequently, the carbon dispersion may be coated. The carbon dispersion may be coated with a nozzle and/or the like to cover at least the side of the negative active material pattern 33. Herein, as shown in FIG. 4B, the carbon dispersion may be coated to cover the one side of the current collector 31. That is, the cover dispersion may cover the top and side of the negative active material pattern 33 and the spacing on one side of the current collector 31 between the negative active material patterns 33.

In addition, the carbon dispersion is dried with a blow-drier and the like to form the carbon layer 35 on at least one side of the negative active material pattern 33.

Subsequently, as shown in FIG. 4C, the negative active material active mass slurry may be coated as a stripe pattern on one side of the current collector 31 between the negative active material patterns 33 without overlapping the negative active material patterns 33.

The negative active material pattern 34 may then be formed between the negative active material patterns 33 through drying with a blow-drier and/or the like.

Furthermore, the negative active material patterns 33 and 34 are pressed to have the desired density, and then, dried again by using a blow-drier and/or the like, to manufacture the negative electrode 30.

Hereinafter, the positive electrode 20 is further described.

The positive electrode 20 may have the same or substantially the same composition as the negative electrode 30 according to one embodiment, except as illustrated hereinafter. Accordingly, any description common with the negative electrode 30 may be omitted.

The shape of the positive electrode 20 is the same or substantially the same as that of the negative electrode 30, which is illustrated in FIGS. 2 and 3.

Referring to FIGS. 2 and 3, the current collector 21 of the positive electrode 20 corresponds to the current collector 31 of the negative electrode 30, the positive active material layer 22 corresponds to the negative active material layer 32, the positive active material pattern corresponds to the negative active material patterns 33 and 34, the carbon layer of the positive electrode 20 corresponds to the carbon layer 35 of the negative electrode 30, and the positive active material corresponds to the negative active material 37.

The current collector 21 of the positive electrode 20 may be any conductor, and may include (e.g., consist of), for example, aluminum, stainless steel, nickel plated steel, and/or the like.

The positive active material pattern may include at least one particulate-type (particulate-shape) of positive active material, and may further include at least one of a suitable conductive material and a suitable binder.

The positive active material may be, for example, a solid solution oxide including lithium, and may be any material capable of electrochemically intercalating and deintercalating lithium ions; however, embodiments of the present invention are not limited thereto.

The solid solution oxide may be, for example, $Li_aMn_xCo_yNi_zO_2$ (where $1.150 \leq a \leq 1.430$, $0.45 \leq x \leq 0.6$, $0.10 \leq y \leq 0.15$, and $0.20 \leq z \leq 0.28$), $LiMn_xCo_yNi_zO_2$ (where $0.3 \leq x \leq 0.85$, $0.10 \leq y \leq 0.3$, and $0.10 \leq z \leq 0.3$), $LiMn_{1.5}Ni_{0.5}O_4$, $Li_{1.20}Mn_{0.55}Co_{0.10}Ni_{0.15}O_2$, and/or the like.

The conductive material may be, for example, carbon black, such as ketjen black, acetylene black, and/or the like; natural graphite, artificial graphite, and/or the like; and/or any material capable of improving conductivity of a positive electrode.

The binder may be, for example, polyvinylidene fluoride, an ethylene-propylene-diene terpolymer, a styrene-butadiene rubber (SBR), an acrylonitrile-butadiene rubber, a fluoroelastomer, polyvinyl acetate, poly(methyl methacrylate), polyethylene, nitrocellulose, and/or the like. However, the binder is not limited thereto, and any binder may be used that binds the positive active material and the conductive material on the current collector 21 and also has oxidation resistance and electrolyte solution stability such that it may endure a high potential of a positive electrode.

The positive active material layer 22 of the positive electrode 20 is illustrated to include a plurality of positive active material patterns extended to have a band shape similar to the negative electrode 30, but the positive electrode 20 may not have this shape, and according to one embodiment, at least one of the positive and negative electrodes 20 and 30 may have an active material layer having the above pattern.

Hereinafter, a method of fabricating the positive electrode 20 is illustrated.

The method of fabricating the positive electrode 20 may be the same or substantially the same as the method of fabricating the negative electrode 30. For example, a positive active material, a binder, and the like are dry-mixed to prepare a positive active material active mass, and subsequently, the positive active material active mass is dispersed in an appropriate organic solvent, thereby preparing positive active material active mass slurry. The other following processes are the same or substantially the same as the method of fabricating the negative electrode 30 and may not be further described here.

Hereinafter, the separator layer 40 is further described.

The separator layer 40 includes a separator and an electrolyte. The separator is not particularly limited and may be any suitable separator in a rechargeable lithium battery. The separator may include a porous layer and/or a non-woven fabric having excellent high-rate discharge performance, which may be used singularly or in a mixture thereof.

The separator may be made of a material, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and/or the like. The polyolefin-based resin may be, for example, polyethylene, polypropylene, and/or the like, and the polyester-based resin may be, for example, polyethylene terephthalate, polybutylene terephthalate, and/or the like.

The electrolyte may have a composition including an electrolytic salt in a non-aqueous solvent.

The non-aqueous solvent may be, for example, cyclic carbonate esters, such as propylene carbonate, ethylene carbonate, butylene carbonate, chloroethylene carbonate, vinylene carbonate, and/or the like; linear carbonates, such as dimethyl carbonate, diethyl carbonate, ethylmethyl carbonate, and/or the like; cyclic esters, such as γ-butyrolactone, γ-valerolactone, and/or the like; linear esters, such as methyl formate, methyl acetate, butyric acid methyl, and/or the like; tetrahydrofuran or a derivative thereof; ethers, such as 1,3-dioxane, 1,4-dioxane, 1,2-dimethoxy ethane, 1,4-dibutoxyethane, methyl diglyme, and/or the like; nitriles, such as acetonitrile, benzonitrile, and/or the like; dioxolane and/or a derivative thereof; or ethylene sulfide, sulfolane, sultone, or a derivative thereof, which may be used singularly or as a mixture of two or more; however, embodiments of the present invention are not limited thereto.

The electrolytic salt may be, for example, an inorganic ion salt including lithium (Li), sodium (Na) or potassium (K), such as $LiClO_4$, $LiBF_4$, $LiAsF_6$, $LiPF_6$, $LiPF_{6-x}(C_nF_{2n+1})_x$ (where $1<x<6$, $n=1$ or 2), LiSCN, LiBr, LiI, $Li_2SO_4$, $Li_2B_{10}Cl_{10}$, $NaClO_4$, NaI, NaSCN, NaBr, $KClO_4$, KSCN and/or the like; an organic ion salt, such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octyl sulfonate, and/or lithium dodecylbenzene sulphonate. These ionic compounds may be used singularly or in a mixture of two or more.

A concentration of the electrolytic salt is not particularly limited, and may be, for example, about 0.8 mol/L to about 1.5 mol/L.

The electrolyte may include various suitable additives. The additive may include a negative electrode-functioning additive, a positive electrode-functioning additive, an ester-based additive, a carbonate ester-based additive, a sulfate ester-based additive, a phosphate ester-based additive, a borate ester-based additive, an acid anhydride-based additive, an electrolyte-based additive, and/or the like. One or more kinds of additives may be added to the electrolyte solution.

Hereinafter, a method of fabricating a rechargeable lithium battery 10 is further described.

The separator is disposed between the positive electrode 20 and the negative electrode 30 to fabricate an electrode structure, and the electrode structure is fabricated to have a desired shape, for example, a cylinder, a prism, a laminate, a button, and/or the like, and then inserted into a container having the same matching shape. Subsequently, the electrolyte is injected into the container to impregnate the electrolyte solution into pores of the separator and to fabricate a rechargeable lithium battery.

The positive electrode and the negative electrode of the rechargeable lithium battery 10 may be the positive electrode 20 and the negative electrode 30 according to one embodiment, but present invention is not thereby limited. For example, at least one or just one of the positive electrode and the negative electrode may be the positive electrode 20 and the negative electrode 30 according to one embodiment.

Hereinafter, the embodiments are illustrated in more detail with reference to several examples. These examples, however, are not in any sense to be interpreted as limiting the scope of the invention. Furthermore, what is not described in this disclosure may be sufficiently understood by those who have knowledge in this field.

Fabrication of Negative Electrode

Example 1

Negative active material active mass slurry was prepared by mixing 98 wt % of natural graphite, 1 wt % of carboxylmethyl cellulose (CMC), and 1 wt % of a styrene-butadiene rubber (SBR) and then, adding water thereto to adjust viscosity of the mixture.

In addition, a dispersion including 5 wt % of acetylene black, 75 wt % of water, and 20 wt % ethanol was prepared.

The negative active material active mass slurry was coated in a stripe pattern on the current collector 31 on one side of a copper foil, dried with a blow-drier set at 80° C. for 15 minutes, thereby forming the negative active material pattern 33. Herein, the stripe pattern, that is, the negative active material pattern 33 was formed to have a gap of 2 mm.

Subsequently, the carbon dispersion was coated all over the top surface of the current collector 31 and dried with a blow-drier set at 80° C. for 15 minutes, thereby forming the carbon layer 35.

Subsequently, the negative active material active mass slurry was coated between the negative active material patterns 33, so that the negative active material patterns 33 may not be overlapped, and then, dried with a blow-drier set at 80° C. for 15 minutes, thereby forming the negative active material pattern 34 between the negative active material patterns 33.

The negative active material patterns 33 and 34 were compressed to have a preset or predetermined density and vacuum-dried at 150° C. for 6 hours, thus manufacturing the negative electrode 30. The negative electrode 30 had the negative active material layer 32 having charge density of 1.60 g/cc.

Example 2

The negative electrode 30 was manufactured according to the same method as Example 1, except for forming the stripe pattern, that is, the negative active material pattern 33 to have a gap of 3 mm.

Example 3

The negative electrode 30 was manufactured according to the same method as Example 1, except for forming the stripe pattern, that is, the negative active material pattern 33 to have a gap of 5 mm.

Comparative Example 1

The negative electrode 30 was manufactured according to the same method as Example 1, except for uniformly coating the negative active material active mass slurry on one side of a copper foil as the current collector 31 and drying it.

Comparative Example 2

The negative electrode 30 was manufactured according to the same method as Example 1, except for not coating carbon dispersion.

Comparative Example 3

The negative electrode 30 was manufactured according to the same method as Example 1, except for not coating carbon dispersion and forming the stripe pattern, that is, forming the negative active material pattern 33 to have a gap of 10 mm.

Comparative Example 4

The negative electrode 30 was manufactured according to the same method as Example 1, except for forming the stripe pattern, that is, forming the negative active material pattern 33 to have a gap of 10 mm.

Comparative Example 5

The negative electrode 30 was manufactured according to the same method as Example 1 except for forming the stripe pattern, that is, forming the negative active material pattern 33 to have a gap of 1 mm.

Evaluation 1: Strength of Negative Electrode

Each negative active material layer 32 of the negative electrodes 30 according to Examples 1 to 3 and Comparative Examples 4 and 5 was evaluated by using a cross-cut method with JIS K5600.

The evaluation results are provided in Table 1.

TABLE 1

| Classification | Explanation |
| --- | --- |
| 0 | Completely smooth on a cut edge and no stripping in graduation of any lattice |
| 1 | A coating layer at the cross-point of the cut peeled off a little. Effects of a cross-cut portion are not greater than 5%. |
| 2 | A coating layer along the edge of the cut and/or at the cross-point peeled off. Effects of a cross-cut portion are greater than 5% and not greater than 15%. |
| 3 | A large portion of a coating layer along the edge of the cut peeled off partially or wholly and/or many |

TABLE 1-continued

| Classification | Explanation |
|---|---|
| | portions of graduation peeled off partially or wholly. Effects of a cross-cut portion are greater than 15% and not greater than 35%. |
| 4 | A large portion of a coating layer along the edge of the cut peeled off partially or wholly and/or some portions of graduation peeled off partially or wholly. Effects of a cross-cut portion are greater than 35% and less than 65% |
| 5 | Peeling-off is greater than classification 4. |

Referring to the evaluation results, the negative electrodes 30 according to Examples 1 to 3 and Comparative Example 4 showed "classification 2", while the negative electrode 30 according to Comparative Example 5 showed "classification 3". For example, the negative electrodes having a stripe pattern gap ranging from 2 mm to 10 mm according to Examples 1 to 3 and Comparative Example 4 showed high strength of a negative active material layer compared with the negative electrode having a stripe pattern gap of 1 mm according to Comparative Example 5.

The reason is provided as follows.

In the carbon layer 35 between the negative active material patterns 33 and 34, the particulate-type of negative active material 37 was less overlapped, and thus the negative active material layer 32 may be easily collapsed. Accordingly, the strength of the negative active material layer 32 was reduced by making a stripe pattern, that is, a gap A between the carbon layers 35 between the negative active material patterns 33 and 34 narrow, so that the carbon layer 35 may be more distributed in the negative active material layer 32, and thus the negative active material layer 32 may be easily collapsed.

When the strength of negative active material layer 32 was reduced, an active material should have dropped away and increased a defect rate during a process of manufacturing a rechargeable lithium battery cell. In addition, when the strength of the negative active material layer 32 was reduced, the negative active material 37 may have dropped away from the current collector 31 due to the volume change of the active material according to charges and discharges, resultantly deteriorating a cycle-life.

Accordingly, the gap A between the carbon layers 35 between the negative active material patterns 33 and 34 may be formed to be greater than 1 mm in order to prevent or lessen strength reduction of the negative active material layer 32.

Fabrication of Coin Cell

Positive active material mix slurry was prepared by mixing 96 wt % of a solid solution oxide, $Li_{1.20}Mn_{0.55}Co_{0.10}Ni_{0.15}O_2$, 2 wt % of ketjen black, and 2 wt % of polyvinylidene fluoride and then, dispersing the mixture in N-methyl-2-pyrrolidone. The positive active material active mass slurry was uniformly coated on an aluminum foil as a current collector and dried with a blow-drier set at 80° C. for 15 minutes. Subsequently, the current collector was pressed and vacuum-dried at 100° C. for 6 hours, thus manufacturing a positive electrode. The positive electrode had a positive active material layer having a charge density of 3.0 g/cc.

The positive electrode was cut to have a diameter of 13 mm, each negative electrode according to Examples 1 to 3 and Comparative Examples 1 to 5 was cut to have a diameter of 15.5 mm, a separator formed of a 25 μm-thick polyethylene microporous film and having a diameter of 19 mm was inserted between the positive and negative electrodes, and then, the positive and negative electrodes and the separator interposed therebetween were inserted into a CR2032 coin cell battery case.

Subsequently, an electrolyte solution obtained by dissolving 1.5 M $LiPF_6$ in a mixed solution of ethylene carbonate/diethylcarbonate/fluoroethylene carbonate (10/70/20 of a volume ratio) was injected into the battery case, and the case was closed and sealed, thus manufacturing a rechargeable lithium battery cell.

Evaluation 2: Discharge Rate Characteristics of Rechargeable Lithium Battery Cell Each rechargeable lithium battery cell according to Examples 1 to 3 and Comparative Examples 1 to 5 was charged at a constant current of 5 mA up to 4.2 V at 25° C. and then, at a constant voltage of 4.2 V up to a current of 0.1 mA, paused for 10 minutes, and then, discharged down to 2.75 V at a constant current of 5 mA. Subsequently, discharge rate characteristics were evaluated by charging the rechargeable lithium battery cells as aforementioned and then, discharging them down to 2.75 V at a constant current of 10 mA, and the results are provided in Table 2.

In Table 2, a discharge rate (%) was obtained as a percentage of discharge capacity at a constant current of 10 mA relative to discharge capacity at a constant current of 5 mA.

Evaluation 3: Cycle Characteristics of Rechargeable Lithium Battery Cell

Each rechargeable lithium battery cell according to Examples 1 to 3 and Comparative Examples 1 to 5 were charged at a constant current of 5 mA up to 4.2 V at 25° C. and then, at a constant voltage of 4.2 V up to a current of 0.1 mA, paused for 10 minutes, and then, discharged at a constant current of 5 mA up to 2.75 V. Herein, the discharge capacity of the rechargeable lithium battery cell was obtained as discharge capacity at the first cycle, cycle characteristics of the cell were evaluated by repeating 100 charge and discharge cycles, and the results are provided in Table 2.

The capacity retention (%) in Table 2 was obtained as a percentage of the discharge capacity at the $100^{th}$ cycle relative to the discharge capacity at the first cycle.

TABLE 2

| | Negative active material layer | Discharge rate (%) | Capacity retention (%) |
|---|---|---|---|
| Comparative Example 1 | No carbon layer Negative active material pattern is not formed | 70 | 67 |
| Comparative Example 2 | No carbon layer Interval of negative active material pattern is 2 mm | 75 | 73 |
| Comparative Example 3 | No carbon layer Interval of negative active material pattern is 10 mm | 70 | 68 |
| Comparative Example 4 | Having a carbon layer Interval A of negative active material pattern is 10 mm | 71 | 68 |
| Example 1 | Having a carbon layer Interval A of negative active material pattern is 2 mm | 82 | 81 |
| Example 2 | Having a carbon layer Interval A of negative active material pattern is 3 mm | 80 | 77 |
| Example 3 | Having a carbon layer Interval A of negative active material pattern is 5 mm | 76 | 74 |

Referring to Table 2, discharge rate characteristics and cycle-life characteristics of the rechargeable lithium battery cells according to Examples 1 to 3 were improved compared with those of the rechargeable lithium battery cells according to Comparative Examples 1 to 4.

For example, the rechargeable lithium battery cells according to Example 1 to 3 showed improved discharge rate characteristics compared with that of the rechargeable lithium battery cell according to Comparative Example 1. The reason is that a charge and discharge reaction was rapidly performed inside the negative active material layer of each negative electrode according to Examples 1 to 3. In the negative electrodes according to. Examples 1 to 3, because a pattern and a carbon layer were formed inside the negative active material layer, ion conductivity in the negative active material layer became increased, and the charge and discharge reaction was rapidly performed compared with the one in the negative electrode according to Comparative Example 1.

In addition, because the charge and discharge reaction was rapidly performed, the charge and discharge reaction was more uniformly performed in the negative electrodes according to Examples 1 to 3, and the rechargeable lithium battery cells were suppressed from capacity deterioration due to an irreversible reaction, such as lithium precipitation, in the negative electrodes. As a result, cycle-life characteristics of the rechargeable lithium battery cells according to Examples 1 to 3 were improved compared with the rechargeable lithium battery cell according to Comparative Example 1.

On the other hand, examining discharge rate characteristics and cycle-life characteristics of Examples and Comparative Examples having the uniform gap between the stripe patterns, that is, between the negative active material patterns, Example 1 and Comparative Example 2 had 2 mm of the same gap of the stripe pattern, that is, the negative active material pattern, but Example 1 having a carbon layer showed improved discharge rate characteristics and cycle-life characteristics when compared with Comparative Example 2 having no carbon layer.

The reason is that the carbon layer included carbon black having a specific surface area and the like and easily soaked in an electrolyte solution, and accordingly, lithium ions in the electrolyte solution were smoothly transferred through the carbon layer between the negative active material patterns. In addition, because the electrons were smoothly transferred through the carbon layer between the negative active material patterns, discharge rate characteristics and cycle-life characteristics of Example 1 having the carbon layer seemed to be improved when compared with Comparative Example 2 having no carbon layer. In this way, the carbon layer in Example 1 seemed to function as an ion diffusion path and an electron transfer path.

In addition, referring to Comparative Examples 3 and 4 having 10 mm as the gap of the stripe patterns, that is, the negative active material patterns, Comparative Example 4 showed equivalent discharge rate characteristics and cycle-life characteristics to those of Comparative Example 3 having no carbon layer. In addition, the Comparative Examples 3 and 4 also showed similar discharge rate characteristics and cycle-life characteristics to those of Comparative Example 1 having no negative active material pattern and no carbon layer.

The reason is that the stripe pattern, that is, the negative active material pattern, had a larger gap of 10 mm, and thus showed reduced effects of the pattern and the carbon layer.

In addition, as the stripe pattern had a smaller gap (i.e., a gap between the carbon layers or between the negative active material patterns, such as the gap A in Examples 1 to 3), discharge rate characteristics and cycle-life characteristics were improved. The reason is that the carbon layer as an ion diffusion path and an electron transfer path was increased and sped up a charge and discharge reaction, and the charge and discharge reaction in the negative electrode was more uniformly performed.

Because the effect of the carbon layer between the negative active material patterns 33 and 34 was not remarkable (not improved), the carbon layer should have a gap A of less than 10 mm.

Accordingly, as the carbon layer had a smaller gap A, that is, was increased as an ion diffusion path and an electron transfer path, an electrode had a uniform charge and discharge reaction, and thus a discharge rate and cycle characteristics were improved. However, as the gap A between the carbon layers became narrow, the strength of the negative active material layer tended to be deteriorated. Accordingly, the gap A between the carbon layers should be larger than 1 mm to prevent or lessen strength deterioration of the negative active material layer.

According to one embodiment, a rechargeable lithium battery cell had a carbon layer as an ion diffusion path and an electron transfer path in the active material layer and thus showed high ion conductivity inside the active material layer and rapidly performed a charge and discharge reaction in the electrode. Accordingly, the charge and discharge reaction was more uniformly performed, and capacity deterioration was suppressed due to degradation according to a non-uniform reaction in the electrode and the like, which resulted in improving cycle-life characteristics of a rechargeable lithium battery cell.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

It will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

While this disclosure has been described in connection with what is presently considered to be practical exemplary embodiments, it is to be understood that the invention is not limited to the disclosed embodiments, but, on the contrary, is intended to cover various suitable modifications and equivalent arrangements included within the spirit and scope of the appended claims, and equivalents thereof.

DESCRIPTION OF SOME OF THE REFERENCE SYMBOLS

10: rechargeable lithium battery
20: positive electrode
21, 31: current collector
22: positive active material layer
30: negative electrode
32: negative active material layer
33, 34: active material pattern
35: carbon layer
37: active material
38: ion transfer path
40: separator layer

What is claimed is:

1. An electrode for a rechargeable lithium battery comprising:
   a current collector; and
   an active material layer on the current collector, the active material layer comprising:
   a plurality of active material patterns having a band shape and arranged with each other in a first direction, and
   a continuous carbon layer arranged between the neighboring active material patterns in the first direction, the continuous carbon layer extending in a second direction toward the current collector, the second direction orthogonal to the first direction,
   wherein the continuous carbon layer is alternatively on top of one active material pattern and alternatively at bottom of an adjacent active material pattern in the second direction and between the plurality of active material patterns;
   the continuous carbon layer on top of the one active material pattern is not present at the bottom of the one active material pattern, and the continuous carbon layer at bottom of the adjacent active material pattern is not present at the top of the adjacent material pattern in the second direction; and
   the continuous carbon layer has a gap of greater than about 1 mm and less than about 10 mm, the gap accommodating the adjacent active material pattern.

2. The electrode of claim 1, wherein the continuous carbon layer comprises acetylene black, ketjen black, and/or carbon black.

3. A rechargeable lithium battery comprising:
   a positive electrode and a negative electrode,
   wherein at least one of the positive and the negative electrodes is the electrode according to claim 1.

4. A rechargeable lithium battery comprising:
   a positive electrode and a negative electrode,
   wherein the negative electrode is the electrode according to claim 1.

* * * * *

UNITED STATES PATENT AND TRADEMARK OFFICE
CERTIFICATE OF CORRECTION

PATENT NO. : 10,818,928 B2
APPLICATION NO. : 14/970321
DATED : October 27, 2020
INVENTOR(S) : Tadayoshi Tanaka It is certified that error appears in the above-identified patent and that said Letters Patent is hereby corrected as shown below:

On the Title Page

Under ABSTRACT — "4 Claims, 4 Drawing Sheets" should read -- 5 Claims, 4 Drawing Sheets -- as attached.

In the Claims

Column 16, Line 45, Claim 5 — below "claim 1." insert -- 5. A rechargeable lithium battery comprising: a positive electrode and a negative electrode, wherein the positive electrode is the electrode according to claim 1. --.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*

(12) United States Patent
Tanaka (10) Patent No.: US 10,818,928 B2
(45) Date of Patent: Oct. 27, 2020

(54) ELECTRODE FOR RECHARGEABLE LITHIUM BATTERY, RECHARGEABLE LITHIUM BATTERY, AND METHOD OF FABRICATING ELECTRODE FOR RECHARGEABLE LITHIUM BATTERY

(71) Applicant: SAMSUNG SDI CO., LTD., Yongin-si, Gyeonggi-do (KR)

(72) Inventor: Tadayoshi Tanaka, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 920 days.

(21) Appl. No.: 14/970,321

(22) Filed: Dec. 15, 2015

(65) Prior Publication Data
US 2016/0172680 A1 Jun. 16, 2016

(30) Foreign Application Priority Data

Dec. 15, 2014 (JP) ................................ 2014-253111
Oct. 16, 2015 (KR) ........................ 10-2015-0144683

(51) Int. Cl.
*H01M 4/62* (2006.01)
*H01M 10/0525* (2010.01)
(Continued)

(52) U.S. Cl.
CPC ........... *H01M 4/625* (2013.01); *H01M 4/043* (2013.01); *H01M 4/0404* (2013.01);
(Continued)

(58) Field of Classification Search
CPC .... H01M 4/625; H01M 4/0404; H01M 4/043; H01M 4/139; H01M 10/0525;
(Continued)

(56) References Cited

U.S. PATENT DOCUMENTS

| 2011/0183206 A1* | 7/2011 | Davis .................. B82Y 30/00 |
| | | 429/218.1 |
| 2012/0107658 A1 | 5/2012 | Kwon et al. |

(Continued)

FOREIGN PATENT DOCUMENTS

| JP | 8-287954 A | 11/1996 |
| JP | 2007-250510 A | 9/2007 |

(Continued)

OTHER PUBLICATIONS

Abstract and English Machine Translation of Japanese Patent Publication No. JP 8-287954 A, Nov. 1, 1996, 6 Pages.
(Continued)

*Primary Examiner* — Milton I Cano
*Assistant Examiner* — Philip A. Stuckey
(74) *Attorney, Agent, or Firm* — Lewis Roca Rothgerber Christie LLP (57) ABSTRACT

There is provided an electrode for a rechargeable lithium battery including a current collector, and an active material layer on the current collector, the active material layer including a plurality of active material patterns having a band shape and a plurality of carbon layers between the neighboring active material patterns, wherein neighboring ones of the carbon layers have a gap of greater than about 1 mm and less than about 10 mm.

5 Claims, 4 Drawing Sheets